US009897792B2

(12) United States Patent
Rout et al.

(10) Patent No.: US 9,897,792 B2
(45) Date of Patent: Feb. 20, 2018

(54) METHOD AND SYSTEM FOR EXTENDED DEPTH OF FIELD CALCULATION FOR MICROSCOPIC IMAGES

(71) Applicant: L&T TECHNOLOGY SERVICES LIMITED, Mysore, Karnataka (IN)

(72) Inventors: Rabi Rout, Mysore (IN); Vajendra Desai, Mysore (IN); Harikrishnan Ramaraju, Mysore (IN); Gineesh Sukumaran, Mysore (IN); Sistu Ganesh, Mysore (IN); Devvrata Priyadarshi, Mysore (IN); Eldho Abraham, Mysore (IN); Saurabh Mishra, Mysore (IN); Sudipta Kumar Sahoo, Mysore (IN); Nivedita Tripathi, Mysore (IN); Siddhartha Goutham, Mysore (IN); Kunal Gauraw, Mysore (IN)

(73) Assignee: L&T TECHNOLOGY SERVICES LIMITED, Mysore (IN)

( * ) Notice: Subject to any disclaimer, the term of this patent is extended or adjusted under 35 U.S.C. 154(b) by 318 days.

(21) Appl. No.: 14/437,174

(22) PCT Filed: Nov. 4, 2013

(86) PCT No.: PCT/IN2013/000681
§ 371 (c)(1),
(2) Date: Apr. 20, 2015

(87) PCT Pub. No.: WO2014/083574
PCT Pub. Date: Jun. 5, 2014

(65) Prior Publication Data
US 2015/0286044 A1 Oct. 8, 2015

(30) Foreign Application Priority Data
Nov. 30, 2012 (IN) .......................... 2010/CHE/2012

(51) Int. Cl.
G02B 21/36 (2006.01)
H04N 1/40 (2006.01)
(Continued)

(52) U.S. Cl.
CPC ....... *G02B 21/367* (2013.01); *G02B 27/0081* (2013.01); *G06T 5/50* (2013.01);
(Continued)

(58) Field of Classification Search
CPC .............. G02B 21/367; G02B 27/0081; G06T 2207/20221; G06T 5/50; G06T 11/60;
(Continued)

(56) References Cited

U.S. PATENT DOCUMENTS 6,201,899 B1   3/2001   Bergen
2001/0036307 A1   11/2001   Hanna et al.
(Continued)

FOREIGN PATENT DOCUMENTS

WO   2009108050 A1   9/2009

OTHER PUBLICATIONS

Extended European Search Report dated Jan. 2, 2017 as received in Application No. 13858441.2.
(Continued)

*Primary Examiner* — Gelek W Topgyal
(74) *Attorney, Agent, or Firm* — Maschoff Brennan

(57) ABSTRACT

The invention relates to an image processing method and system for constructing composite image with extended depth of field. The composite image may be constructed from a plurality of source images of a scene stored in an image stack. The method includes aligning the images in the image stack such that every image in the image stack is aligned with other images in the stack, performing illumination and color correction on the aligned images in the image stack, generating an energy matrix for each pixel of each illumination and color corrected image in the image stack by computing energy content for each pixel, generating a raw index map that contains the location of every pixels having maximum energy level among all the images
(Continued)

in the image stack, generating degree of defocus ma and constructing the composite image.

9 Claims, 3 Drawing Sheets

(51) Int. Cl.
*G02B 27/00* (2006.01)
*G06T 5/50* (2006.01)
*H04N 5/232* (2006.01)

(52) U.S. Cl.
CPC ....... *H04N 1/40012* (2013.01); *H04N 5/2329* (2013.01); *G06T 2207/10052* (2013.01); *G06T 2207/20221* (2013.01)

(58) Field of Classification Search
CPC . G06T 2207/10052; G06T 2207/10056; G06T 5/003; H04N 1/40012; H04N 5/2329; H04N 21/2387; H04N 21/6587; H04N 21/4147; H04N 21/4333; H04N 5/76; H04N 5/783; H04N 5/85; G11B 27/005; G11B 27/105
See application file for complete search history.

(56) References Cited

U.S. PATENT DOCUMENTS

| 2004/0234155 | A1 | 11/2004 | Hoshuyama |
| 2008/0212168 | A1 | 9/2008 | Olmstead et al. |
| 2008/0234984 | A1 | 9/2008 | Ortyn et al. |
| 2012/0162733 | A1* | 6/2012 | Ferraro ................ G03H 1/0866 359/9 |
| 2013/0010067 | A1* | 1/2013 | Veeraraghavan ...... G01B 11/22 348/46 |
| 2013/0215107 | A1* | 8/2013 | Kimura .................. G06T 15/00 345/419 |
| 2013/0329122 | A1* | 12/2013 | Geisler ............. H04N 5/23212 348/345 |

OTHER PUBLICATIONS

Hassen et al., "Multifocus Image Fusion Using Local Phase Coherence Measurement", Image Analysis and recognition, vol. 5627, 2009, pp. 54-63.

Zhao et al., "Multi-focus color image fusion in the HSI space using the sum-modified-laplacian and a coarse edge map", Image and Vision Computing,vol. 26, Issue 9, Sep. 1, 2008, pp. 1285-1295.

* cited by examiner

METHOD AND SYSTEM FOR EXTENDED DEPTH OF FIELD CALCULATION FOR MICROSCOPIC IMAGES

FIELD OF THE INVENTION

The invention relates to image processing field in general and particularly to a method and system for extending depth of field in an imaging device.

BACKGROUND OF THE INVENTION

Limited depth of field is a common problem in imaging devices such as conventional light microscope. Objects imaged in such cases are sharply in focus over a limited distance known as the depth of field. The Depth of field (DOF) is the distance between the nearest and farthest objects in a scene that appear acceptably sharp in an image. Typically sharpness decreases with depth resulting in blurriness in at least some part of the image. Also, in order to capture a large amount of light from a small specimen under the imaging device, one needs to have a high numerical aperture. However, high numerical aperture results in a very shallow depth of field, due to which it is not possible to have all region of the scene to be in focus.

To improve the depth of field in a captured image, one or more digital image processing techniques may be employed. Using the digital image processing techniques, images taken at different depths of field of the same scene may be combined to produce a single composite image. The digital image processing techniques involve capturing multiple images of the same scene to form an image stack, identifying focused part from multiple images in the stack and recreating a single image with better depth of field by combining the focused parts. During the digital processing process, index information of the images in the stack is collected and processed to generate a depth map and composite image or/and a 3D model of the scene.

Typically, greater the number of images in the image stack greater is the DOF in the composite image. Though with the increase in number of images in the stack, the complexity, time required for processing the images, errors in the composite image and memory requirement also increases. There are many processing techniques which provide solutions to improve the depth of field. However, the known solutions have one or the other drawback such as misalignment of the images in the stack, illumination variations in the composite image, noises in the Depth map and composite image, low quality of the composite image with blotchy background, edge shadowing and depth cross over time complexity of the processes involved in depth of field calculations too many manually configurable parameters and unable to manage large image stacks.

Therefore, there is a need to have an improved method and system for digital image processing that may address at least one of the above mentioned limitations.

SUMMARY OF THE INVENTION

According to embodiments of the invention an image processing method for constructing a composite image with extended depth of field is disclosed. The composite image may be constructed from a plurality of source images of a scene stored in at least one image stack. The plurality of source images may be taken at substantially identical fields of view. The method includes aligning the images in the image stack such that every image in the image stack is aligned with other images in the stack, performing illumination and color correction on the aligned images in the image stack, generating an energy matrix for each pixel of each illumination and color corrected image in the image stack by computing energy content for each pixel, generating a raw index map that contains the location of every pixels having maximum energy level among all the images in the image stack, generating degree of defocus map by comparing the energy content at a particular pixel in all the images against a reference signal and repeating the process for all the pixels and constructing the composite image using raw index map and degree of defocus map.

According to another embodiment a system for constructing a composite image with extended depth of field, from a plurality of source images of a scene is disclosed. The disclosed system include a memory for storing a plurality of source images of a scene taken at substantially identical fields of view, a processing unit for processing the images stored in the memory, to align the images in the image stack such that every image in the image stack is aligned with other images in the stack, perform illumination and color correction on the aligned images in the image stack, generate an energy matrix for each pixel of each illumination and color corrected image in the image stack by computing energy content for each pixel, generate a raw index map that contains the location of every pixels having maximum energy level among all the images in the image stack, generate degree of defocus map by comparing the energy content at a particular pixel against a reference signal and constructing the composite image using raw index map and degree of defocus map and an output unit for displaying the composite image received from the processing unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the disclosure.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Figure 1:
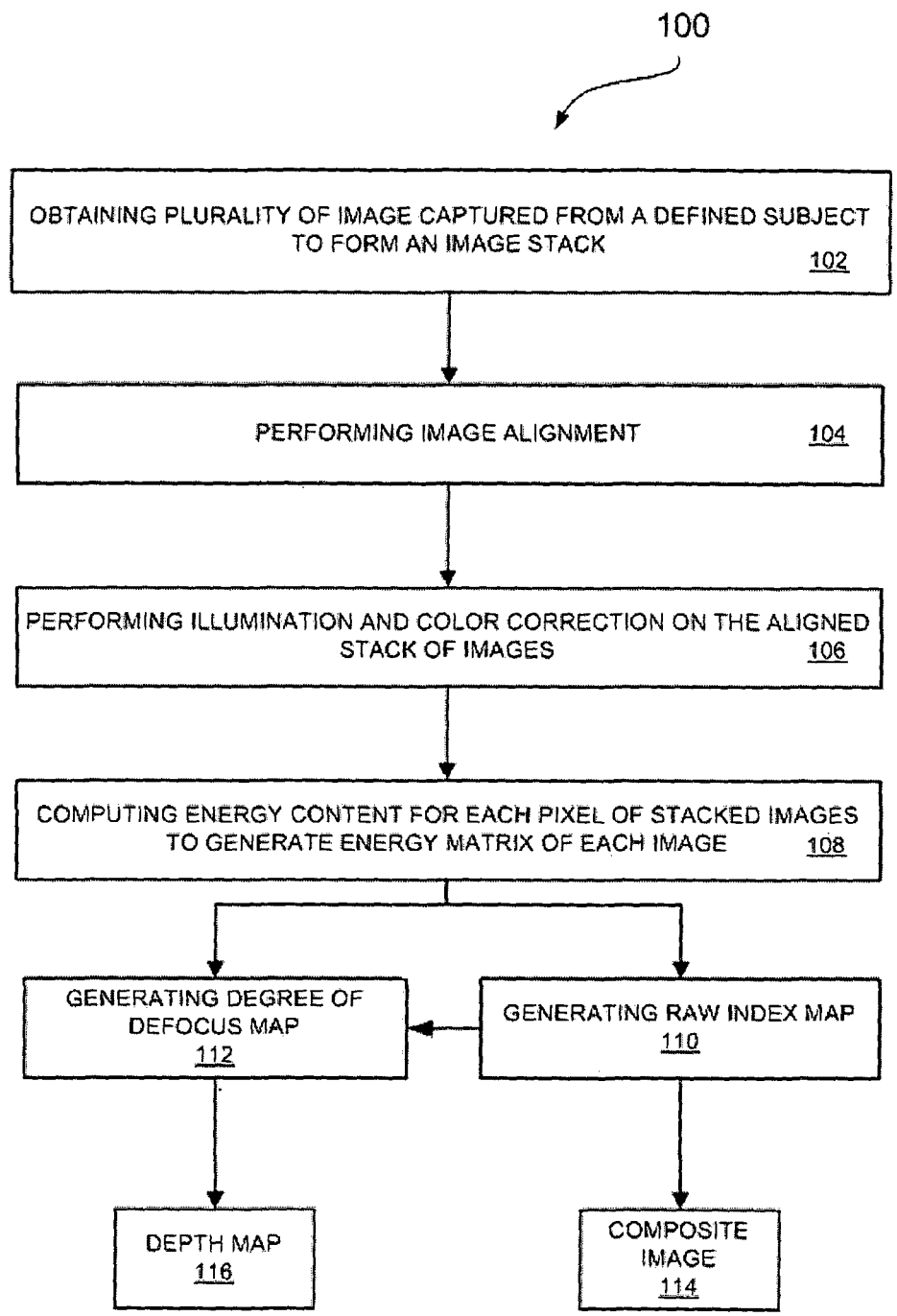
FIG. 1 illustrates a flow chart of a method for processing a plurality of images taken of a scene to generate a composite image with extended depth of field, according to one embodiment of the invention.

FIG. 1 illustrates a flow chart of a method 100 for processing a plurality of images taken of a scene to generate a composite image with extended depth of field, according to an exemplary embodiment of the invention. The extended depth of field indicates a greater depth of field in the composite/processed image as compared to the original image before processing.

At step 102, the method obtains a plurality of image captured from a defined subject, where the images are taken from different positions for said subject. According to an embodiment, the images may be captured from any known imaging device such as but not limiting to, optical microscope, digital camera, etc. According to another embodiment, the images may be obtained from an archive having images of said subject captured from different positions. According to yet another embodiment, the different positions include capturing images from different 'Z' level of the imaging device. The obtained images are arranged in a stack to form an image stack.

At step 104, the method performs image alignment. The image alignment is the process of transforming different sets of image data in the image stack so that all the images may have one coordinate system. The image data may be obtained from different sensors, at different time, or from different viewpoints. The image alignment process enables processing of the images obtained from the different measurements/sources. The image alignment process involves finding an optimal one-to-one mapping between the pixels in one image to those in other images in the stack.

According to one embodiment, a bi-directional image alignment method may be used for aligning the images in the image stack. The bi-directional image aligning method may include arranging the images in a sequence, such that the images are arranged as per their respective distance from the 'Z' level. Among the image sequence a first reference image may be selected, such that the first reference image is the substantially central image in the image sequence. The alignment process further includes comparing the first reference image with immediate left side and immediate right side images in the sequence. The geometric transformation between the immediate left side image and the immediate right side image may be calculated with respect to the first reference image. Based on calculations, the immediate left side image and the immediate right side image may be aligned with the first reference image. Subsequently immediate left side image may be compared with second image on the left side of the first reference image in the image sequence and immediate right side image may be compared with the second image on the right side of the first reference image in the image sequence and aligned with the immediate left side and the immediate right side images respectively. The process may be repeated for all the images thereby resulting in an aligned image stack that has substantially all images aligned with each other. The first and last image in the stack may have large variations and processing images in one direction that is from first to last may not provide effectively aligned image stack. Moreover processing images in one direction may result in a lot of time and memory consumption. On the other hand disclosed two way processing of images reduces time and result in better aligned stack of images.

According to an embodiment of the invention, the process of comparison and alignment may be performed by any known conventional method in the image alignment process. According to another embodiment of the invention, the process of comparison and alignment may be performed by the parametric image alignment process. The parametric image alignment process includes specifying the particular geometric parametric transformation and then estimating the parameter by means of any known optimization method. The miss-aligned images generally have an affine transformation and six parameters (a, b, c, d, e, and f) needed to be estimated for this:

$$x'=a*x+b*y+c$$

$$y'=d*x+e*y+f$$

These parameters may be identified using any known suitable optimization method. According to an exemplary embodiment of the invention, the disclosed method uses a hierarchical coarse-to-fine approach of parametric image alignment using gradient descent optimization method and normalized cross correlation as cost function based on image pyramids.

The exemplary illustrated method of comparison and alignment includes reducing the resolution on the images in the image stack by a scale factor in a range of between ½ to 1/16. According to yet another embodiment, the resolution of the images may be reduced by a scale factor of ⅛ of the original resolution to generate a stack of down sampled images. The method further includes creating an image pyramid of down sampled images and performing a coarse estimation of the transformation on the down sampled images. In microscopic imaging, the whole series of images or some part of a series of images may undergo through same transformations. Hence, if the second image undergoes through substantially same transformation, the transformation parameters obtained from the first image may be used as a clue or initial guess of transformation of next image. According to an embodiment, the hierarchical coarse-to-fine parametric image alignment process is implemented by a guided optimization process. The guided optimization process includes implementing an initial guess method/algorithm to search for global optima of the cost function faster by making it to start the iterations near the global optima position of the previous image cost function. The illustrated process of comparison and alignment is only exemplary in nature and may not be construed limiting on the invention. Any other known method/process of comparison and alignment may be used without going beyond the scope of the invention.

Figure 2:
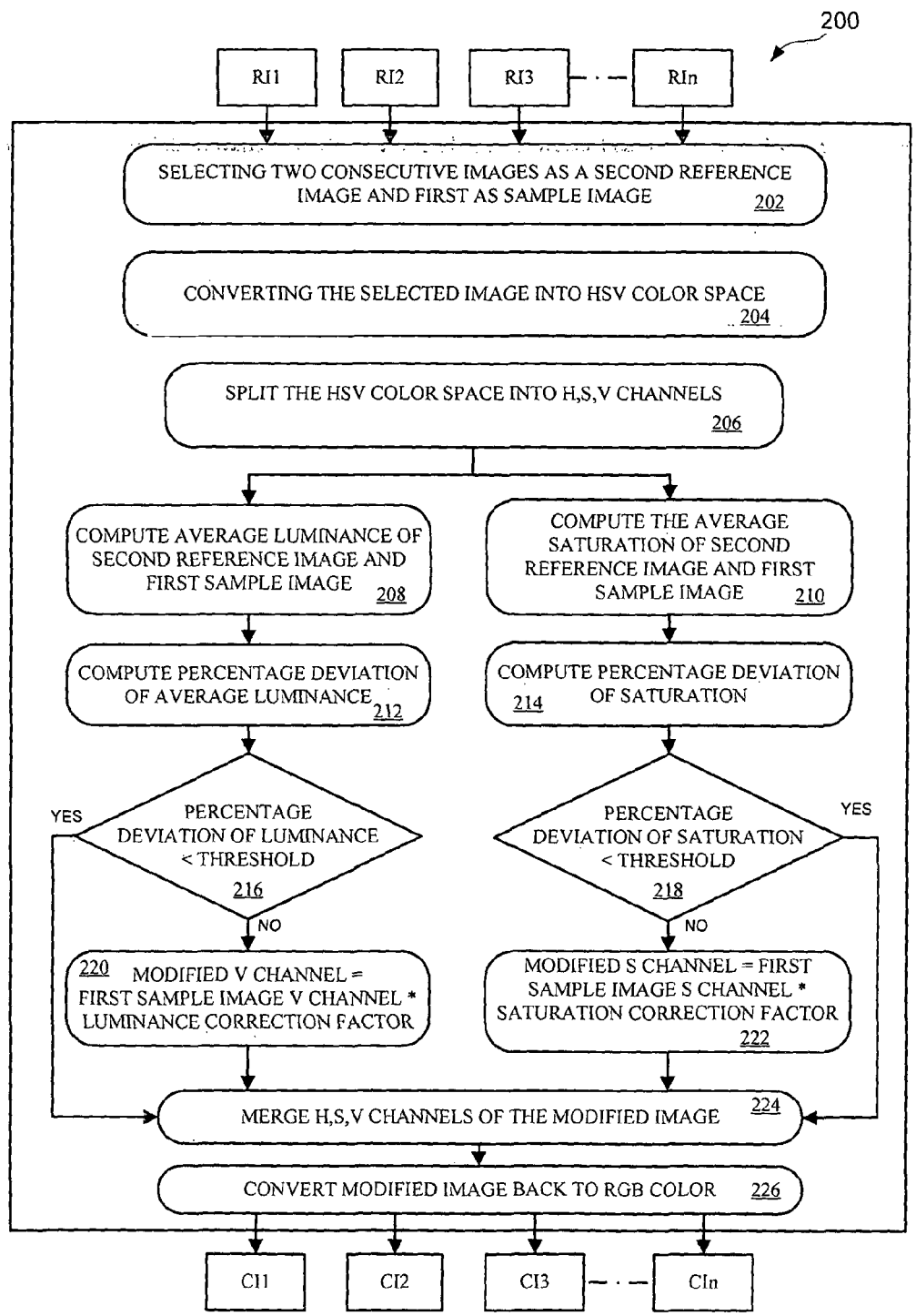
FIG. 2 illustrates a method for performing illumination and color correction according to an embodiment of the invention.
Figure 3:
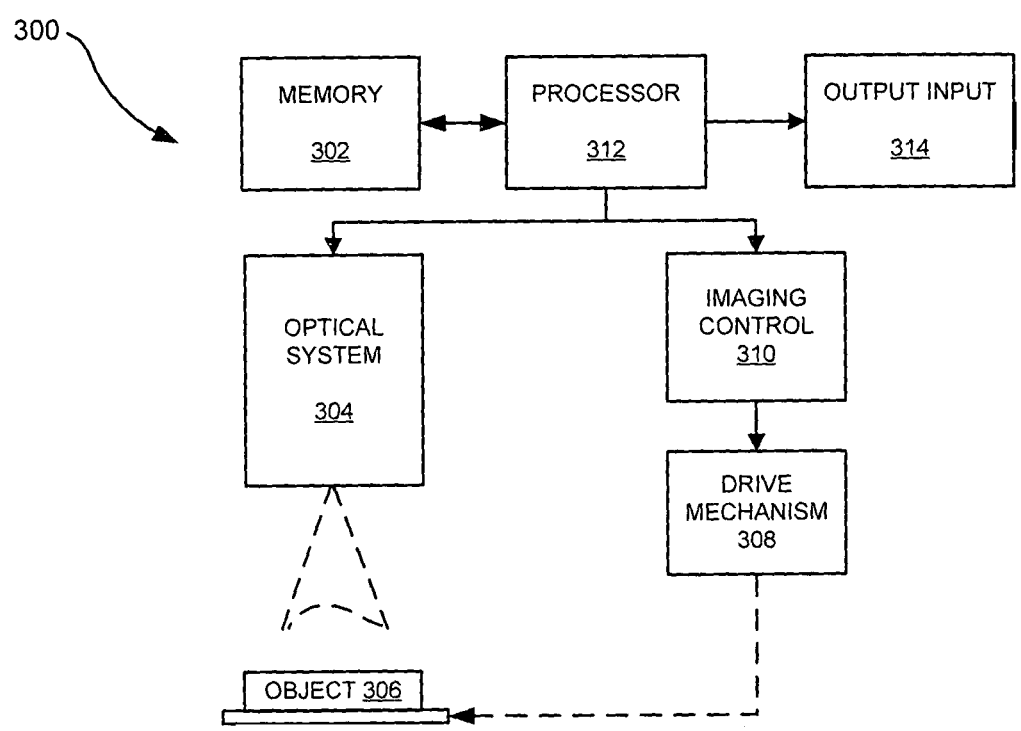
FIG. 3 illustrates a block diagram of a system for constructing a composite image with extended depth of field, from a plurality of source images of a scene according to one embodiment of the invention.

At step 106, the method performs illumination and color correction on the aligned stack of images. FIG. 2 illustrates an exemplary flow chart 200 to illustrate the method for performing illumination and color correction according to an embodiment of the invention. $RI_1, RI_2, RI_3 \ldots RI_n$, refers to the aligned images in the stack of images. The method 200 of performing illumination and color correction, at step 202 may include selecting at least two consecutive images from the stack of aligned images, where one of the image is considered as a second reference image and the other is considered as first sample image. At step 204, the selected images are converted from RGB colour space to HSV colour space. According to an embodiment of the invention, the conversion from RGB to HSV may be performed by any known method. At step 206, the HSV color images may be split into HSV channels. Further, at step 208 and step 210 the method computes the average value of luminance and average value of saturation for both the HSV images respectively. At step 212 and step 214, percentage deviation of average luminance and average saturation may be calculated respectively for the first sample image with respect to the second reference image. At step 216 and step 218, the percentage deviation of average luminance and percentage deviation of average saturation is compared with a predefined threshold value respectively. According to an embodiment, the threshold value is more than 2 percent deviation. According to another embodiment, threshold value may be more than 5 percent deviation. If the percentage deviation of average luminance is more than the predefined threshold value then the first sample image may be multiplied by a luminance correction factor at step 220, else the image may be retained without incorporating any change. The luminance correction factor is the ratio of the average value of the illumination of the first sample image divided by average value of illumination for the second reference image. Similarly, if the percentage deviation of average saturation is more than the predefined threshold value, then the first sample image may be multiplied by a saturation correction factor at step 222, else the image may be retained without incorporating any change. The luminance correction factor is the ratio of the average value of the saturation of the first sample image divided by average value of saturation for the second reference image. At step 224, the HSV channels of the processed images are merged together. The disclosed process may be repeated for all the images in the aligned image stack considering the corrected first sample image as second reference image for the next image and similarly repeating the process for other images. Once corrected, the images may be again converted in RGB color space at step 226 and stored in the image stack.

At step 108, the method computes energy content for each pixel of illuminated and color corrected stacked images to generate energy matrix of each image. According to an exemplary embodiment, complex wavelet decomposition method may be used for wavelet decomposition. According to the complex wavelet decomposition method, the step of computing energy content includes selecting one of the images from the illuminated and color corrected image stack. Selected image is converted from RGB color scale to grayscale for wavelet decomposition. The method further includes down sampling the grayscale image to a lower resolution exemplary by one level and normalizing the intensity values in the range of 0 to 1. Processing the image at a lower resolution may reduce the impulse noises present in the images and hence may provide better results. The method further includes, convolving the down sampled image with a complex wavelet filter bank to generate an energy matrix for said image. The process may be repeated for all the images in the illuminated and color corrected image stack so as to have at least one energy matrix for each image in the stack. According to another embodiment the energy matrix may be generated using any other known process such as but not limited to real wavelets (Haar, Daubechies), difference of Gaussians, variance, Tenengrad, Fourier transform and high pass filter.

At step 110, the method generates a raw index map for the scene. The process of generating raw index map includes analyzing the energy matrix's pixel by pixel basis for all the images and identifying maximum focused pixel for a particular pixel in the image stack. The process is repeated for all the pixels of the scene and an index of all the focused pixels may be used to generate the raw index map.

At step 112, the method generates degree of defocus map by comparing the energy content at a particular pixel against a reference signal, where the reference signal is a Gaussian curve. The Gaussian curve may be generated by identifying the peak focus measure values and the value of minima at left side and right side of the peak value for a particular pixel in the image stack by analyzing the energy matrix's generated at step 108. Using the log of the energy values of maxima and minima the Gaussian curve may be generated. The generated Gaussian curve may be used as the reference signal to compare the focus and out of focus regions in different image. The computed result may be used to generate degree of defocus map. Focus measure values in the regions where the object is focused, will follow Gaussian nature while other parts having extensive smoothness in texture follow random nature. Therefore pixels corresponding to focused part yield low gauss-fit values whereas smooth pixels yield high values. So, the in-focus segmentation of the object may be identified using degree of defocus map.

At step 114, the method may generate a composite image using the raw index map and the degree of defocus map. The index map, which is constructed by taking the index of the stack corresponding to the highest frequency in the temporal direction for each pixel, may contain noise (random index) wherever the scene is out of Focus. The noise needs to be removed and the index map needs to be further processed. According to an embodiment, the steps of refining the index map includes eliminating noise by masking the index map with the degree of defocus map, expanding the masked index map, blurring the result by a smoothing filter and overlapping the masked index map on blurred output. The out of focus regions may have high measure in the degree of defocus map. A threshold of at least 25% of the maximum value may be applied to remove the out of focus regions. According to yet another embodiment, in the composite image, the out of focus regions may be picked from the last image of the stack to avoid blotchiness. The current index values in the out of focus regions may be changed to maximum index values (index of the last image). The in-focus region in the index map may be dilated and blurred in order to get a smooth transition between the object index values and the highest index value of the out of focus region. Finally, the masked index map may be placed on the processed image to get the refined index map.

At step 116, the method generates a depth map using the raw index map and the degree of defocus map. The step of generating a depth map includes, performing depth interpolation by polynomial fitting of the maximum index value in the index map. Scaling the image in the available intensity range for detailed information of depth of object. Subtracting the background with help of weighted background mask and smooth the image for noise cancellation and up sampling the generated Depth Map to fit the original size of input image.

According to yet another embodiment, the plurality of source images of the scene may be distributed in two or more image stacks. Images in the first stack may be processed to generate a composite image by the method 100 illustrated above. The generated composite image is then included in the next image stack and again another composite is generated by processing images in the stack by the method 100 illustrated above. The same process may be followed for all the stacks to generate a final composite image. Illustrated process may save memory requirement, if the initial stack contains large number of images.

According to an embodiment, the disclosed exemplary method may be implemented as a computer program embedded in a carrier, such as but not limited to, a diskette, a CD-ROM or a modulated carrier wave.

According to yet another embodiment, a system 300 for constructing a composite image with extended depth of field, from a plurality of source images of a scene is disclosed. The composite image may be constructed from the plurality of source images of a scene stored in at least one image stack provided in a memory 302. The plurality of source images may be taken at substantially identical fields of view. According to an embodiment, the system may have arrangement for obtaining images such that each image being obtained at a different focal distance. As illustrated system 300 includes an optical system 304 having a field of view focused on the object 306. A drive mechanism 308, which may be controlled by an imaging control 310, may be coupled to the optical system 304 for changing the distance between the optical system 304 and the object 306. Accordingly the lens may be placed in a succession of different distances from the object, while concurrently maintaining the same field of view. According to another embodiment, the image plane may be kept at a substantially constant distance from the lens, while the focal length of the optical system 304 may be changed successively. The captured images may be stored in the memory 302.

The disclosed system 300 further includes a processing unit 312. According to an embodiment, the processing unit 312 may process the images to align the images in the image stack such that every image in the image stack is aligned with other images in the stack, perform illumination and color correction on the aligned images in the image stack, generate an energy matrix for each pixel of each illumination and color corrected image in the image stack by computing energy content for each pixel, generate a raw index map that contains the location of every pixels having maximum energy level among all the images in the image stack, generate degree of defocus map by comparing the energy content at a particular pixel against a reference signal and constructing the composite image using raw index map and degree of defocus map. The constructed image may be stored in the memory 302 or may be sent to an output unit 314 such as but not limited to image display, printer, video display screen etc.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims along with the full scope of equivalents to which such claims are entitled. In the appended claims, the terms "including" and "in which" are used as the plain-English equivalents of the respective terms "comprising" and "wherein," respectively.

We claim:

1. An image processing method for constructing a composite image with extended depth of field, from a plurality of source images of a scene stored in at least one image stack, the plurality of source images being taken at substantially identical fields of view, the method comprising:

aligning the images in the image stack such that every image in the image stack is aligned with other images in the stack, wherein the images are aligned by a bi-directional image alignment method, the bi-directional image alignment method includes,
  arranging the images in a sequence in the image stack;
  selecting a first reference image, such that the first reference image is the substantially central image in the image sequence;
  aligning the first reference image with immediate left side and immediate right side images in the sequence; and
  repeating the alignment process for the next image on left side and right side of the reference image with respect to the aligned images;
performing illumination and color correction on the aligned images in the image stack;
generating an energy matrix for each pixel of each illumination and color corrected image in the image stack by computing energy content for each pixel;
generating a raw index map that contains the location of every pixels having maximum energy level among all the images in the image stack;
generating degree of defocus map by comparing the energy content at a particular pixel in all the images against a reference signal and repeating the process for all the pixels; and
constructing the composited image using the raw index map and the degree of defocus map.

2. The method as claimed in claim 1, wherein the left side and right side images are aligned by a hierarchical coarse-to-fine parametric image alignment process.

3. The method as claimed in claim 2, wherein the hierarchical coarse-to-fine parametric image alignment process is implemented by a guide optimization process.

4. The method as claimed in claim 1, wherein the step of performing illumination and color correction comprises:
  selecting a second reference image and a sample image from the aligned images such that the second reference image and the sample image are consecutive images in the image stack;
  converting the selected images from RGB colour space to HSV colour space;
  computing an average luminance and an average saturation value of the HSV colour space images;
  calculating the percentage deviation of the average luminance and the average saturation for the first sample image with respect to the second reference image;
  multiplying the first sample image with a luminance correction factor, if the percentage deviation of the average luminance is more than a predefined threshold level, and/or multiplying the first sample image with a saturation correction factor, if the percentage deviation of the average saturation variation is more than a predefined threshold level to obtain the modified first sample image, else using the first sample image as modified first sample image;

repeating the process for all the images, by considering the modified first sample image image as the first reference image and next consecutive image as first sample image; and converting the modified images from HSV color scale to RGB color scale.

5. The method as claimed in claim 4, wherein the predefined threshold level is more than 2 percent deviation of the average luminance and/or the average saturation variation.

6. The method as claimed in claim 4, wherein the luminance correction factor is the ratio of the average value of the illumination of the first sample image divided by average value of illumination for the second reference image.

7. The method as claimed in claim 4, wherein the saturation correction factor is the ratio of the average value of the saturation of the first sample image divided by average value of saturation for the second reference image.

8. The method as claimed in claim 1, wherein the step of generating an energy matrix comprises:

converting each color and illumination corrected RGB image to grayscale image;

down sampling the image to low resolution of intensity values in the range of 0 to 1; and convolving the down sampled image with a complex wavelet filter bank to generate the energy matrix.

9. The method as claimed in claim 1, wherein the reference signal is a Gaussian curve is generated by:

taking an array of energy values from energy each matrices in temporal direction for each pixel location and identifying a peak value in each array;

identifying a local minima on both sides of the Peak energy, value, in the array; and generating the Gaussian curve by taking log of the energy values between the maxima and two minima.

* * * * *